(12) United States Patent
Terahara

(10) Patent No.: US 10,769,898 B2
(45) Date of Patent: Sep. 8, 2020

(54) COMMODITY SALES PROCESSING APPARATUS

(71) Applicant: TOSHIBA TEC KABUSHIKI KAISHA, Shinagawa-ku, Tokyo (JP)

(72) Inventor: Toshiyasu Terahara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/519,043

(22) Filed: Jul. 23, 2019

(65) Prior Publication Data
US 2020/0066114 A1   Feb. 27, 2020

(30) Foreign Application Priority Data
Aug. 24, 2018   (JP) ................................ 2018-157160

(51) Int. Cl.
*G07G 1/00* (2006.01)
*G06K 7/10* (2006.01)

(52) U.S. Cl.
CPC ......... *G07G 1/009* (2013.01); *G06K 7/10366* (2013.01); *G07G 1/0018* (2013.01)

(58) Field of Classification Search
None
See application file for complete search history.

(56) References Cited

U.S. PATENT DOCUMENTS

| 2007/0235531 | A1* | 10/2007 | Addison ................... A47F 9/04 235/383 |
| 2011/0147454 | A1* | 6/2011 | Matsuhisa .......... G06K 7/10861 235/383 |
| 2015/0302379 | A1* | 10/2015 | Terahara .............. G06Q 20/208 235/375 |
| 2017/0372290 | A1 | 12/2017 | Terahara et al. |

FOREIGN PATENT DOCUMENTS

JP   2008-059502   3/2008
JP   6268350        1/2018

OTHER PUBLICATIONS

Extended European Search Report for European Patent Application No. 19193326.6 dated Dec. 10, 2019.

* cited by examiner

*Primary Examiner* — Kristy A Haupt
(74) *Attorney, Agent, or Firm* — Amin, Turocy & Watson, LLP

(57) ABSTRACT

According to one embodiment, a commodity sales processing apparatus includes a placement portion, an antenna, a reading unit, a notification unit, and a control unit. A commodity is placed in the placement portion. The antenna receives a signal from an RFID tag included in the commodity placed in the placement portion. The reading unit reads information of the RFID tag based on the signal received via the antenna. The notification unit notifies that the commodity is placed in the placement portion. The control unit controls the notification unit after settlement processing.

17 Claims, 10 Drawing Sheets

COMMODITY SALES PROCESSING APPARATUS

CROSS-REFERENCE TO RELATED APPLICATION

This application is based upon and claims the benefit of priority from Japanese Patent Application No. 2018-157160, filed on Aug. 24, 2018, the entire contents of which are incorporated herein by reference.

FIELD

Embodiments described herein relate generally to a commodity sales processing apparatus.

BACKGROUND

A commodity sales processing apparatus is known which reads commodity information from an RFID tag attached to a commodity and performs settlement processing based on the commodity information.

A configuration with a placement portion is known as a commodity sales processing apparatus of the above type. The placement portion is provided with an antenna that receives a signal from the RFID tag. The commodity sales processing apparatus collectively reads the information of the RFID tags of the commodities placed in the placement portion.

A customer places commodities in the placement portion when checking out with the commodity sales processing apparatus. However, the customer may forget to take out commodities from the placement portion after the settlement processing.

DETAILED DESCRIPTION

Embodiments provide a commodity sales processing apparatus capable of preventing a customer from forgetting to take out a commodity.

In general, according to one embodiment, a commodity sales processing apparatus includes a placement portion, an antenna, a reading unit, a notification unit, and a control unit. A commodity is placed in the placement portion. The antenna receives a signal from an RFID tag included in the commodity placed in the placement portion. The reading unit reads information of the RFID tag based on the signal received via the antenna. The notification unit notifies that the commodity is placed in the placement portion. The control unit drives the notification unit after settlement processing.

Figure 1:
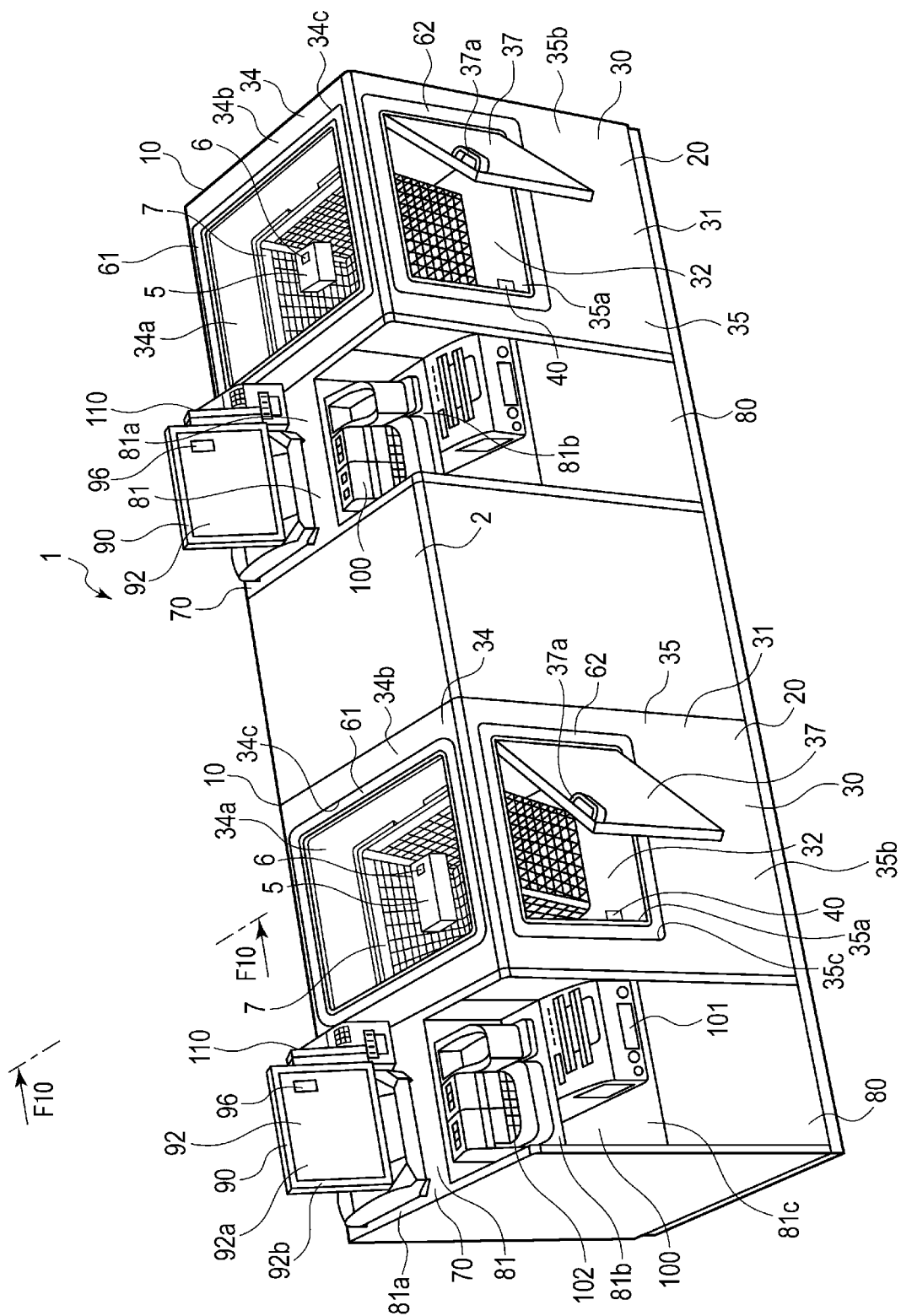
FIG. 1 is a perspective view showing a configuration of a commodity sales processing apparatus according to a first embodiment.
Figure 2:
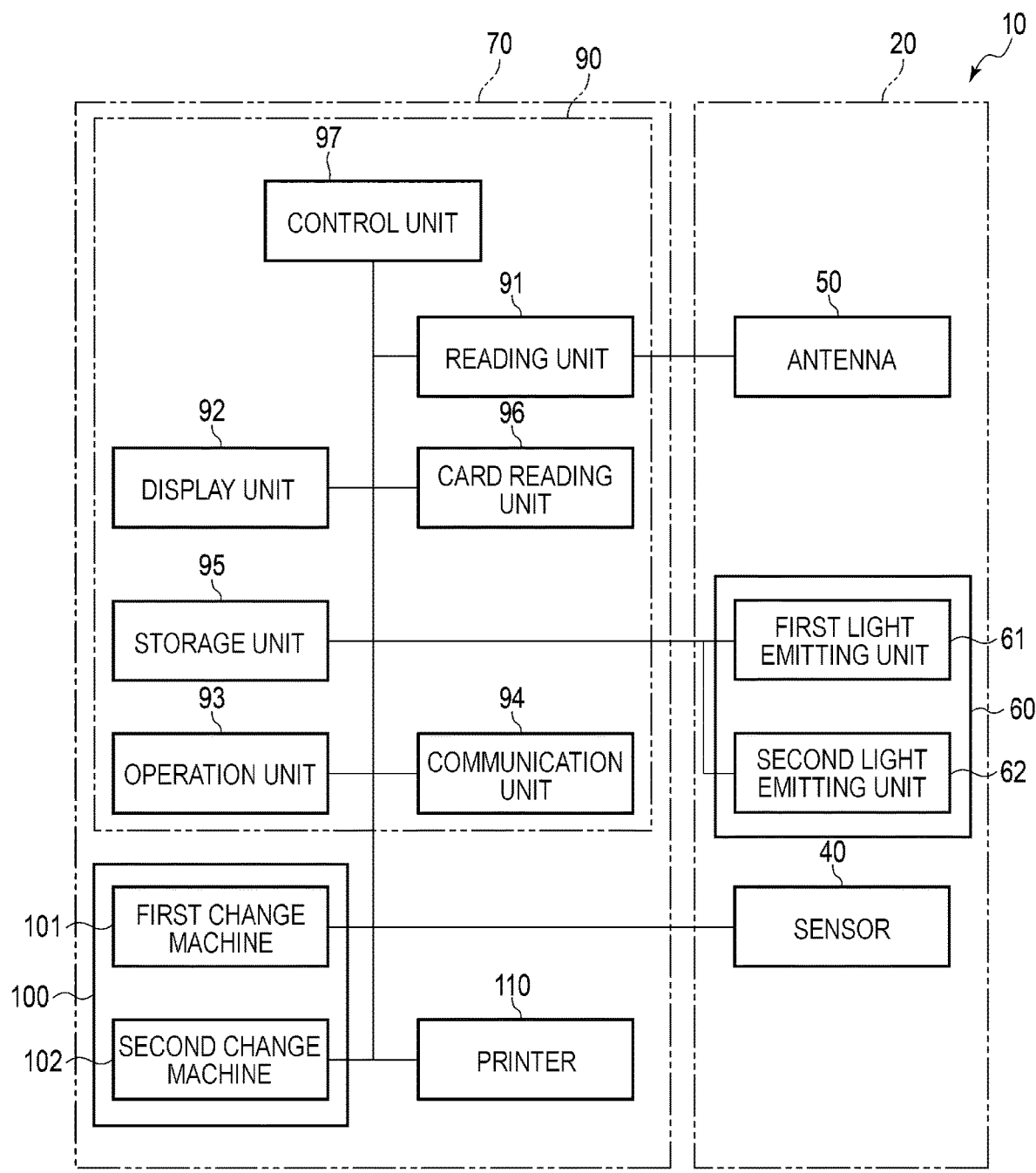
FIG. 2 is a block diagram showing the configuration of the commodity sales processing apparatus.
Figure 3:
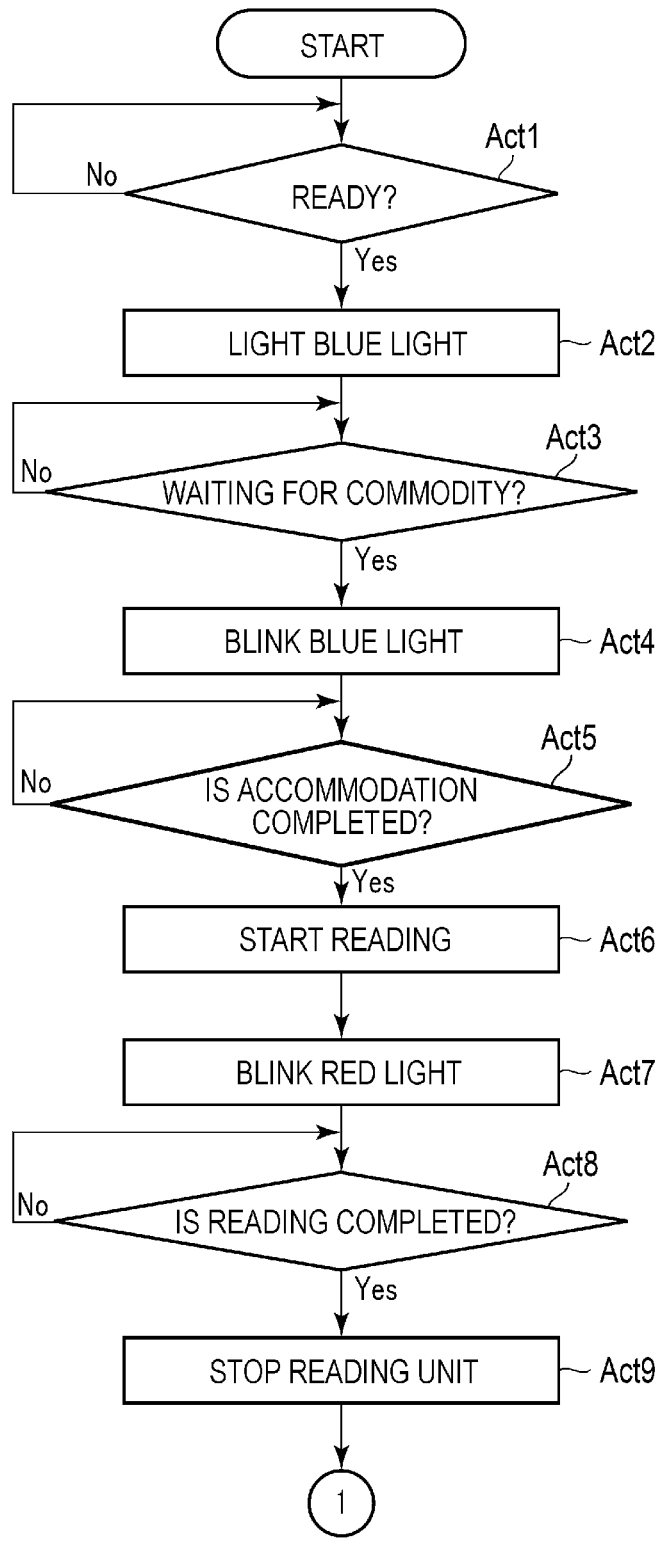
FIG. 3 is a flowchart showing an example of an operation of the commodity sales processing apparatus.
Figure 4:
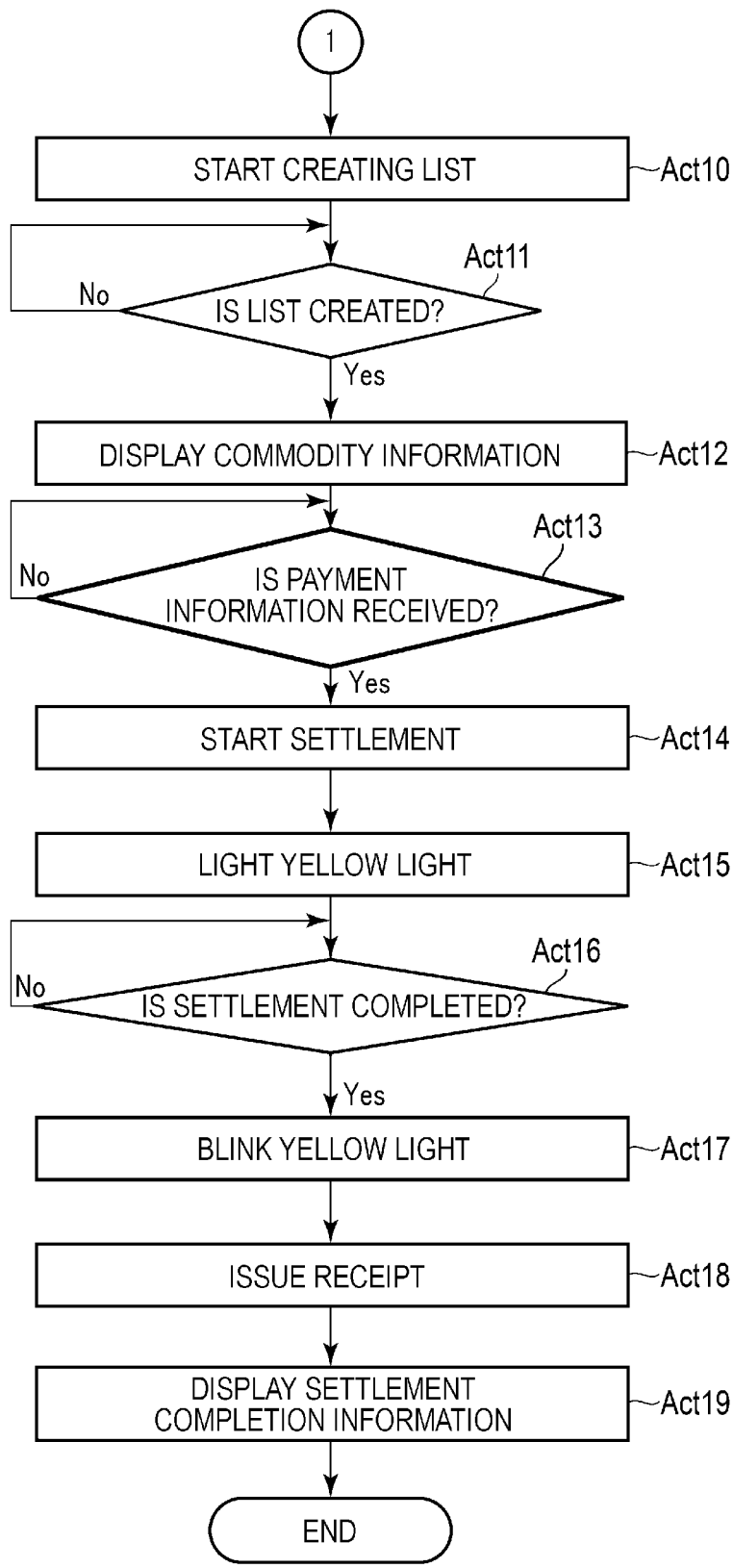
FIG. 4 is a flowchart showing an example of the operation of the commodity sales processing apparatus.

A commodity sales processing apparatus 10 according to a first embodiment will be described with reference to FIGS. 1 to 4. FIG. 1 is a perspective view showing a configuration of the commodity sales processing apparatus 10. FIG. 2 is a block diagram showing the configuration of the commodity sales processing apparatus 10. FIGS. 3 and 4 are flowcharts showing an example of an operation of the commodity sales processing apparatus 10.

As shown in FIG. 1, the commodity sales processing apparatus 10 includes a reading device 20 and a processing device 70. The commodity sales processing apparatus 10 receives a signal from an RFID tag 6 of a commodity 5 by the reading device 20. Further, the commodity sales processing apparatus 10 reads the information of the RFID tag 6 by the processing device 70, for example. The commodity sales processing apparatus 10 performs sales registration processing and checkout processing based on the information of the RFID tag 6 read by the processing device 70.

In the present embodiment, the sales registration processing is the processing of creating a commodity list based on the information of the RFID tag 6. The checkout processing includes calculation processing and settlement processing. The calculation processing is a processing of calculating the amount of money to be paid by a customer based on the commodity list. The settlement processing is to end a sales transaction based on payment information from the customer.

Such a commodity sales processing apparatus 10 is used, for example, in a self-checkout apparatus. The self-checkout apparatus is used as a checkout apparatus in which a customer himself or herself performs an operation for sales registration processing and an operation for checkout processing. As a self-checkout apparatus, for example, there is a self-point-of-sale (POS) apparatus.

The operation for sales registration processing is an operation of placing the commodity 5 in a specific placement portion so that the commodity sales processing apparatus 10 can execute the sales registration processing. The operation for checkout processing is an operation required to the customer when the commodity sales processing apparatus 10 performs the checkout processing. The operation for checkout processing is, for example, an operation of an operation unit.

The commodity sales processing apparatus 10 is not limited to being used in a self-checkout apparatus. In another example, the commodity sales processing apparatus 10 may be used in a semi-self-checkout apparatus. The semi-self-checkout apparatus is, for example, a checkout apparatus in which a clerk performs an operation for sales registration processing and a customer performs an operation for checkout processing.

Here, the commodity 5 is a commodity to be sold at a store when the commodity sales processing apparatus 10 is installed in the store such as a convenience store. The commodity 5 has the RFID tag 6.

The RFID tag 6 has information about the commodity 5. The information about the commodity 5 includes, for example, the name of the commodity 5, the price of the commodity 5, and identification information for identifying the commodity 5. The information included in the RFID tag 6 is not limited to thereto. The RFID tag 6 is configured to be readable and writable. The RFID tag 6 is, for example, a passive tag having no battery and configured to be operable in a UHF band.

The reading device 20 receives a signal from the RFID tag 6 of the commodity 5. As shown in FIGS. 1 and 2, the reading device 20 includes a reading device main body 30, a sensor 40, an antenna 50, and a light emitting unit 60.

The reading device main body 30 includes an outer shell 31 and an accommodation chamber 32. The outer shell 31 defines the outer shell of the reading device main body 30. The outer shell 31 is, for example, configured in a rectangular shape.

The accommodation chamber 32 is provided in the outer shell 31. The accommodation chamber 32 is an example of the placement portion. The commodity 5 is placed in the placement portion when the processing device 70 performs the checkout processing.

The accommodation chamber 32 is configured to accommodate the commodity 5 therein. In the present embodiment, the accommodation chamber 32 is configured to accommodate a container 7. The container 7 is a so-called shopping basket in which the customer puts and carries the commodity 5 for which is not paid in the store. The accommodation chamber 32 is not limited to being able to accommodate the container 7. The accommodation chamber 32 may be configured to have a size and a shape that can accommodate only the commodity 5.

The accommodation chamber 32 is configured in the outer shell 31, for example. The accommodation chamber 32 is configured to be openable and closable by a door. An upper wall portion 34 of the outer shell 31 is configured so that the customer can visually check the inside of the accommodation chamber 32. As a specific example, the upper wall portion 34 is partially configured with a transparent portion 34a. The transparent portion 34a is formed of a transparent material. The transparent portion 34a is formed in a rectangular shape as an example. The transparent material is, for example, colorless glass.

An upper surface 34b of the upper wall portion 34 is configured to be usable as, for example, a bagging platform for commodities. The upper surface 34b (including the transparent portion 34a) is formed on a horizontal surface as a specific example of the configuration.

At least one of side wall portions 35 includes a door 37. Specifically, an opening 35a is formed in at least one of the side wall portions 35. The opening 35a is continuous with the accommodation chamber 32. The door 37 is provided at the opening 35a. The door 37 is provided with, for example, a handle 37a that can be held by the customer.

In the present embodiment, the opening 35a is formed in one side wall portion 35 of the four side wall portions 35 as an example. The one side wall portion 35 is a side wall portion facing the customer. Here, the front-rear direction and the left-right direction of the commodity sales processing apparatus 10 are defined. The side wall portion 35 side including the door 37 in the commodity sales processing apparatus 10 is assumed to be the front side. The side wall portion 35 side facing the side wall portion 35 including the door 37 is assumed to be the rear side. The direction perpendicular to each of the vertical direction and the front-rear direction is assumed to be the left-right direction.

The door 37 is provided at the edge portion of the opening 35a so as to be able to open and close the opening 35a by, for example, a hinge. The door 37 and the opening 35a are configured such that the commodity 5 can pass through the opening 35a when the door 37 is open. As this specific example, the opening 35a is configured to have a size and a shape through which the container 7 can pass when the door 37 is opened to a predetermined position.

The sensor 40 is configured to transmit a signal according to an open or closed state of the door 37. The sensor 40 is, for example, a switch. The sensor 40 transmits a signal, for example, with the door 37 closed. The sensor 40 does not transmit a signal when the door 37 is open. The sensor 40 is not limited to a switch. It is sufficient as long as the sensor 40 is configured so that opening and closing of the door 37 can be detected.

The antenna 50 is configured to receive a signal from the RFID tag 6 of the commodity 5 accommodated in the accommodation chamber 32. The antenna 50 is, for example, provided on the surface that constitutes the accommodation chamber 32.

The light emitting unit 60 is an example of a notification unit. The notification unit notifies the customer of the state in which the commodity 5 is accommodated in the accommodation chamber 32. The light emission unit 60 notifies the customer by light-emitting. The light emitting unit 60 is configured to be switchable between a light emitting state and a non-light emitting state. The non-light emitting state is a state in which light is not emitted.

The light emitting unit 60 emits light by lighting or blinking a light source such as an LED as an example. In the present embodiment, the light emitting unit 60 is selectively configured to light or blink. To light is to maintain a state of continuously emitting light. Furthermore, the light emitting unit 60 is configured to light or blink light of a plurality of colors. The color of the light emitted by the light emitting unit 60 is, for example, blue, red, or yellow. As a specific example, the light emitting unit 60 includes a light source of each color.

The light emitting unit 60 is provided on the outer shell 31 as an example. A plurality of light emitting units 60 are provided as an example, and two light emitting units are provided as a specific example. Here, one light emitting unit 60 is referred to as a first light emitting unit 61, and the other light emitting unit 60 is referred to as a second light emitting unit 62.

The first light emitting unit 61 is provided on the upper surface 34b of the upper wall portion 34 of the outer shell 31. The first light emitting unit 61 is configured in a rectangular annular shape in which the transparent portion 34a is disposed inside, as an example. In a portion of the upper surface 34b where the first light emitting unit 61 is provided, for example, a rectangular annular groove 34c is formed. The groove 34c is formed in a rectangular annular shape in which the transparent portion 34a is disposed inside.

A light source such as a light emitting diode (LED) constituting the first light emitting unit 61 is accommodated in the groove 34c. The groove 34c is closed by a lid formed of a transparent material such as glass, as an example. The lid is formed flush with the other part of the upper surface 34b. The first light emitting unit 61 emits light in a range surrounding the transparent portion 34a of the upper surface 34b.

The second light emitting unit 62 is provided on the outer surface 35b of the side wall portion 35 including the door 37. The second light emitting unit 62 is, for example, formed in a rectangular annular shape in which the opening 35a is disposed inside. In a portion of the outer surface 35*b* where the second light emitting portion 62 is provided, for example, a rectangular annular groove 35*c* is formed.

A light source such as an LED constituting the second light emitting portion 62 is accommodated in the groove 35*c*. The groove 35*c* is closed by a lid formed of a transparent material such as glass, as an example. The lid is formed flush with the other part of the outer surface 35*b* of the side wall portion 35. The second light emitting unit 62 emits light in a range surrounding the opening 35*a* of the outer surface 35*b*.

The processing device 70 is configured to perform sales registration processing and checkout processing based on the signal from the RFID tag 6 received by the reading device 20. The processing device 70 includes, for example, a housing 80, a terminal 90, a change machine 100, and a printer 110.

The housing 80 is provided with the terminal 90, the change machine 100, and the printer 110. The housing 80 is arranged on the side of the reading device 20. The housing 80 includes an upper surface 81 having different heights, as one example. The upper surface 81 includes a first upper surface portion 81*a*, a second upper surface portion 81*b*, and a third upper surface portion 81*c*.

The first upper surface portion 81*a* is the rear of the upper surface 81. The second upper surface portion 81*b* is a part of a portion in front of the first upper surface portion 81*a*. The second upper surface portion 81*b* is lower than the first upper surface portion 81*a*. The third upper surface portion 81*c* is a portion in front of the second upper surface portion 81*b*. The third upper surface portion 81*c* is lower than the second upper surface portion 81*b*.

The terminal 90 and the printer 110 are arranged in the first upper surface portion 81*a*, as an example. As an example, a second change machine 102 constituting the change machine 100 is arranged in the second upper surface portion 81*b*. In the third upper surface portion 81*c*, as an example, a first change machine 101 constituting the change machine 100 is arranged.

The terminal 90 includes a reading unit 91, a display unit 92, an operation unit 93, a communication unit 94, a storage unit 95, a card reading unit 96, and a control unit 97.

The reading unit 91 is electrically connected to the antenna 50 via a signal line. The reading unit 91 reads the information of the RFID 6 based on the signal of the RFID tag 6 received by the antenna 50. Furthermore, the reading unit 91 has a function of writing information in the RFID tag 6 via the antenna 50 as an example. In other words, the reading unit 91 is a so-called reader and writer in the present embodiment.

The reading unit 91 may be provided in the reading device 20 without being provided in the processing device 70. As an example, the reading unit 91 may be provided in the reading device main body 30. In the case of this configuration, the reading unit 91 may be connected to the control unit 97 via a signal line.

The display unit 92 is, for example, a liquid crystal display. The display unit 92 includes a display screen 92*a* and a frame 92*b*. The frame 92*b* exposes the display screen. The display unit 92 displays, for example, information necessary for the customer to perform an operation for checkout processing. This information includes, as an example, information on the commodity 5, information stored in the storage unit 95, and information on the input and operation of the commodity sales processing apparatus 10.

The operation unit 93 is an input device through which the customer inputs information. The operation unit 93 is, for example, a touch panel provided in the display unit 92. The operation unit 93 transmits the input information to the control unit 97.

The communication unit 94 is a communication interface configured to communicate with an external device. The communication unit 94 transmits the commodity information acquired by the reading unit 91 to the outside.

The storage unit 95 stores a program executed by the control unit 97, information on sales commodity registration, and the like. The storage unit 95 includes, for example, a read only memory (ROM) for storing a control program and the like, and a random-access memory (RAM) for storing data, which temporarily stores information when the control unit 97 executes a program.

The card reading unit 96 includes, for example, a first card reading unit and a second card reading unit. The first card reading unit reads a contactless IC card. The second card reading unit reads a contact type IC card, a magnetic card or the like. The card reading unit 96 transmits the read card information to the control unit 97. Here, the card includes, for example, a credit card, a prepaid card, a card capable of paying electronic money, and the like.

The control unit 97 is, for example, a central processing unit (CPU) or the like. The control unit 97 executes various control and processing functions by executing the program stored in the storage unit 95.

The control unit 97 is electrically connected to the sensor 40, the reading unit 91, the display unit 92, the operation unit 93, the communication unit 94, the storage unit 95, the first light emitting unit 61, the second light emitting unit 62, the first change machine 101, the second change machine 102, and the printer 110. The control unit 97 controls each of the electrically connected components according to the program stored in the storage unit 95.

The control unit 97 determines whether the door 37 is in the open state or the door 37 is in the closed state, based on the signal from the sensor 40. The control unit 97 controls the reading unit 91 to read the information of the RFID tag 6 via the antenna 50. The control unit 97 controls the reading unit 91 to write information in the RFID tag 6 via the antenna 50. The control unit 97 controls the reading unit 91, the display unit 92, the communication unit 94, and the change machine 100 to perform sales registration processing and checkout processing.

The control unit 97 controls the light emitting units 61 and 62 to light or blink light of a color according to the state of the commodity sales processing apparatus 10.

In this embodiment, as an example, when the commodity sales processing apparatus is in a ready state, the control unit 97 drives the light emitting units 61 and 62 to light blue light and maintain a state of continuously emitting the blue light. The ready state is a state of waiting for a customer, in which sales registration processing and checkout processing are not performed.

In a state of waiting for a commodity, the control unit 97 drives the light emitting units 61 and 62 to blink the blue light continuously. A state of waiting for a commodity is a state in which the use of the commodity sales processing apparatus 10 is started by the operation of the operation unit 93 by an operator and the accommodation operation of the commodity 5 in the accommodation chamber 32 is not completed.

After the operation unit 93 is operated, when detecting that the door 37 is opened from a closed state and closed after being opened based on the signal from the sensor 40, the control unit 97 determines that the accommodation operation of the commodity 5 in the accommodation chamber 32 is completed. That is, when detecting the opening and closing of the door 37 when the customer accommodates the commodity 5 in the accommodation chamber 32, the control unit 97 determines that the accommodation operation of the commodity 5 in the accommodation chamber 32 is completed.

The control unit 97 drives the light emitting units 61 and 62 to continuously blink red light in a state of reading the commodity 5 and a state of performing the sales registration processing.

In a state in which settlement processing is being performed, the control unit 97 drives the light emitting units 61 and 62 to light yellow light and maintain a state of continuously emitting the yellow light.

When the settlement processing is completed, the control unit 97 drives the light emitting units 61 and 62 to blink the yellow light continuously. The state in which the settlement processing is completed is a state in which the commodity 5 is accommodated in the accommodation chamber 32, and is also a state in which a customer happens to forget to take out the commodity because the customer is supposed to take out the commodity. Blinking the yellow light by the light emitting units 61 and 62 is an example of a notification indicating a state in which the commodity 5 is stored in the accommodation chamber 32. After the completion of the settlement processing, the light emitting units 61 and 62 blink the yellow light, thereby calling the customer's attention not to forget to take out the commodity 5.

Blinking the yellow light is useful for calling attention. In particular, in Japan, the yellow light emitted by the signal provided on a road is a color that calls the attention of a driver of a vehicle. For this reason, in the present embodiment, blinking of yellow light is employed as an example of a combination of the color of light and the light emitting state that calls the customer's attention.

The change machine 100 processes the input money. The change machine 100 includes the first change machine 101 for banknotes and the second change machine 102 for coins. The first change machine 101 and the second change machine 102 are configured to transmit information on the input money to the control unit 97. The first change machine 101 is arranged in the third upper surface portion 81c. The second change machine 102 is arranged in the second upper surface portion 81b.

The printer 110 outputs a receipt on which the information and the like of the commodity 5 for which the checkout processing is completed is printed. The printer 110 is arranged in the first upper surface portion 81a.

The commodity sales processing apparatus 10 configured as described above constitutes a processing unit 1 in pairs as an example. The processing unit 1 includes, as an example, two commodity sales processing apparatuses 10 and a work table 2. The two commodity sales processing apparatuses 10 are spaced apart in the left-right direction. The work table 2 is arranged between the two commodity sales processing apparatuses 10. The upper surface of the work table 2 is configured to be flush with the upper surface 34b of the outer shell 31 of the reading device main body 30.

Next, an example of the operation of the commodity sales processing apparatus 10 will be described with reference to the flowcharts of FIGS. 3 and 4.

When the commodity sales processing apparatus 10 is in a ready state (Yes in Act 1), the control unit 97 drives the light emitting units 61 and 62 to light the blue light and maintain a state of continuously emitting the blue light. (Act 2). If the commodity sales processing apparatus 10 is not in a ready state (No in Act 1), the control unit 97 waits until the commodity sales processing apparatus 10 becomes ready.

Then, the control unit 97 determines whether or not the commodity sales processing apparatus 10 is in a state of waiting for a commodity based on the information from the operation unit 93 and the information from the sensor 40 (Act 3). The control unit 97 monitors the information from the operation unit 93 and the information from the sensor 40 until it is determined that the commodity sales processing apparatus 10 is in a state of waiting for a commodity (No in Act 3).

The customer operates the operation unit 93 by touching the area displayed on the display unit 92 for inputting checkout start to input a command for starting the sales registration of the commodity 5. To touch the area for inputting the checkout start is to cause the commodity sales processing apparatus 10 to start sales registration processing and checkout processing.

When receiving a signal of the checkout start from the operation unit 93, the control unit 97 determines that the commodity sales processing apparatus 10 is in a state of waiting for a commodity, stops the lighting of the blue light by the light emitting units 61 and 62, and drives the light emitting units 61 and 62 to continuously blink the blue light (Yes in Act 3, Act 4).

When the customer touches the area for inputting the checkout start, the door 37 is open and the customer accommodates the container 7 containing the commodity 5 or the commodity 5 in the accommodation chamber 32. In addition, the customer closes the door 37 when the container 7 or the commodity 5 is accommodated in the accommodation chamber 32. The sensor 40 transmits a signal according to the open or closed state of the door 37 at this time to the control unit 97.

The control unit 97 continues the blinking of the blue light by the light emitting units 61 and 62 based on the signal from the sensor 40 until it is determined that the accommodation operation of the container 7 or the commodity 5 in the accommodation chamber 32 is completed (No in Act 5). That is, in the state of waiting for a commodity, the blinking of the blue light by the light emitting units 61 and 62 is continued.

The control unit 97 determines the completion of the accommodation operation of the container 7 or the commodity 5 in the accommodation chamber 32 based on the signal from the sensor 40. When it is determined that the accommodation operation is completed (Yes in Act 5), the control unit 97 starts reading the RFID tag 6 of the commodity 5 (Act 6). Specifically, the control unit 97 controls the reading unit 91 to radiate radio waves from the antenna 50 and read the RFID tag 6 of the commodity 5 in the accommodation chamber 32.

When reading is started, the control unit 97 stops the lighting of the blue light by the light emitting units 61 and 62 and drives the light emitting units 61 and 62 to continuously blink the red light (Act 7). In the state of reading processing (No in Act 8) or the state of commodity registration processing, the control unit 97 continues the blinking of the red light by the light emitting units 61 and 62.

When the reading of the information on the RFID tag 6 of the commodity 5 in the accommodation chamber 32 is completed (Yes in Act 8), the control unit 97 stops the reading of the RFID tag 6 by the reading unit 91 (Act 9). In addition, when the reading of the RFID tag 6 is stopped, the control unit 97 starts commodity registration processing. Specifically, the control unit 97 creates a commodity list (Act 10).

When the creation of the commodity list is completed (Yes in Act 11), the control unit 97 controls the display unit 92 to display the commodity list and information on the price to be paid by the customer on the display unit 92 (Act 12). The calculation of the price to be paid by the customer is calculation processing that is a part of the checkout processing. In addition, when the information on the price to be paid is displayed on the display unit 92, the control unit 97 displays payment methods. The payment methods include a cash payment method, a credit card payment method, an electronic money payment method, and the like. The customer touches the area where one of the methods is displayed.

When the customer selects the settlement by cash, the cash corresponding to the price is put into the change machine 100. When the settlement by card is selected, an operation required for the card reading unit to read a credit card is performed. The operation required for the card reading unit to read a credit card is, for example, an operation to bring a credit card into contact with the card reading unit.

When receiving the payment information (Yes in Act 13), the control unit 97 starts settlement processing (Act 14). The control unit 97 continues the blinking of the red light by the light emitting units 61 and 62 until the payment information is received (No in Act 13). The payment information is information of cash inserted into the change machine 100 or information of a credit card read by the card reading unit.

When the settlement processing is started, the control unit 97 drives the light emitting units 61 and 62 to light the yellow light and maintain a state of continuously emitting the yellow light (Act 15). The control unit 97 maintains the lighting of the yellow light by the light emitting units 61 and 62 until the settlement processing is completed (No in Act 16). In the settlement processing, when there is a change, the control unit 97 drives the change machine 100 to return the change.

When the settlement processing is completed (Yes in Act 16), the control unit 97 drives the light emitting units 61 and 62 to blink the yellow light (Act 17). In addition, when the settlement processing is completed, the control unit 97 controls the printer 110 to issue a receipt (Act 18). Further, when the settlement processing is completed, the control unit 97 controls the display unit 92 to display information on the settlement processing completion on the display unit 92 (Act 19).

The customer takes out the container 7 containing the commodity 5 or the commodity 5 from the accommodation chamber 32 when the display unit 92 displays the completion of the checkout processing. When the customer takes out the container 7 or the commodity 5 from the accommodation chamber 32, the customer places the container 7 or the commodity 5 on the upper surface 34b of the reading device main body 30 or the upper surface of the work table 2. When the customer places the container 7 or the commodity 5 on the upper surface 34b or the work table 2, the customer performs a bagging operation of the commodity 5.

The customer's attention is called to the accommodation chamber 32 by recognizing the blinking of the yellow light by the light emitting units 61 and 62. By calling attention to the accommodation chamber 32, it is possible to prevent forgetting to take out the commodity 5 from the accommodation chamber 32. The control unit 97 maintains the blinking of the yellow light by the light emitting units 61 and 62 for a predetermined time, as an example. The control unit 97 stops the driving of the light emitting units 61 and 62 when the duration of the blinking of the yellow light by the light emitting units 61 and 62 elapses the predetermined time. That is, the light emitting units 61 and 62 do not emit light. This predetermined time may be, for example, the time between cash input and the end of closing a wallet. This predetermined time is obtained by experiment or the like.

According to the commodity sales processing apparatus 10 configured as described above, since the light emitting unit 60 calls attention of the customer, it is possible to prevent the occurrence of forgetting to take out the commodity 5.

Furthermore, since the light emitting units 61 and 62 are provided in the reading device main body 30 of the reading device 20, attention is called to the accommodation chamber 32. For this reason, it is possible to further prevent the customer from forgetting to take out the commodity 5 from the accommodation chamber 32.

Furthermore, the upper wall portion 34 of the outer shell 31 has the transparent portion 34a. Therefore, when the customer looks at the reading device 20 by calling the customer's attention to the accommodation chamber 32, the customer looks at the commodity 5 in the accommodation room 32 through the transparent portion 34a. For this reason, since the customer can recognize that the commodity 5 is in the accommodation chamber 32, it is possible to prevent the customer from forgetting to take out the commodity 5 from the accommodation chamber 32.

In the present embodiment, a plurality of light emitting units 60 are provided. However, the number of light emitting unit 60 is not limited to being plural. For example, as the light emitting unit 60, only one of the first light emitting unit 61 or the second light emitting unit 62 may be provided. Furthermore, the light emitting unit 60 is not limited to two. Three or more light emitting units 60 may be provided in the reading device 20.

Figure 5:
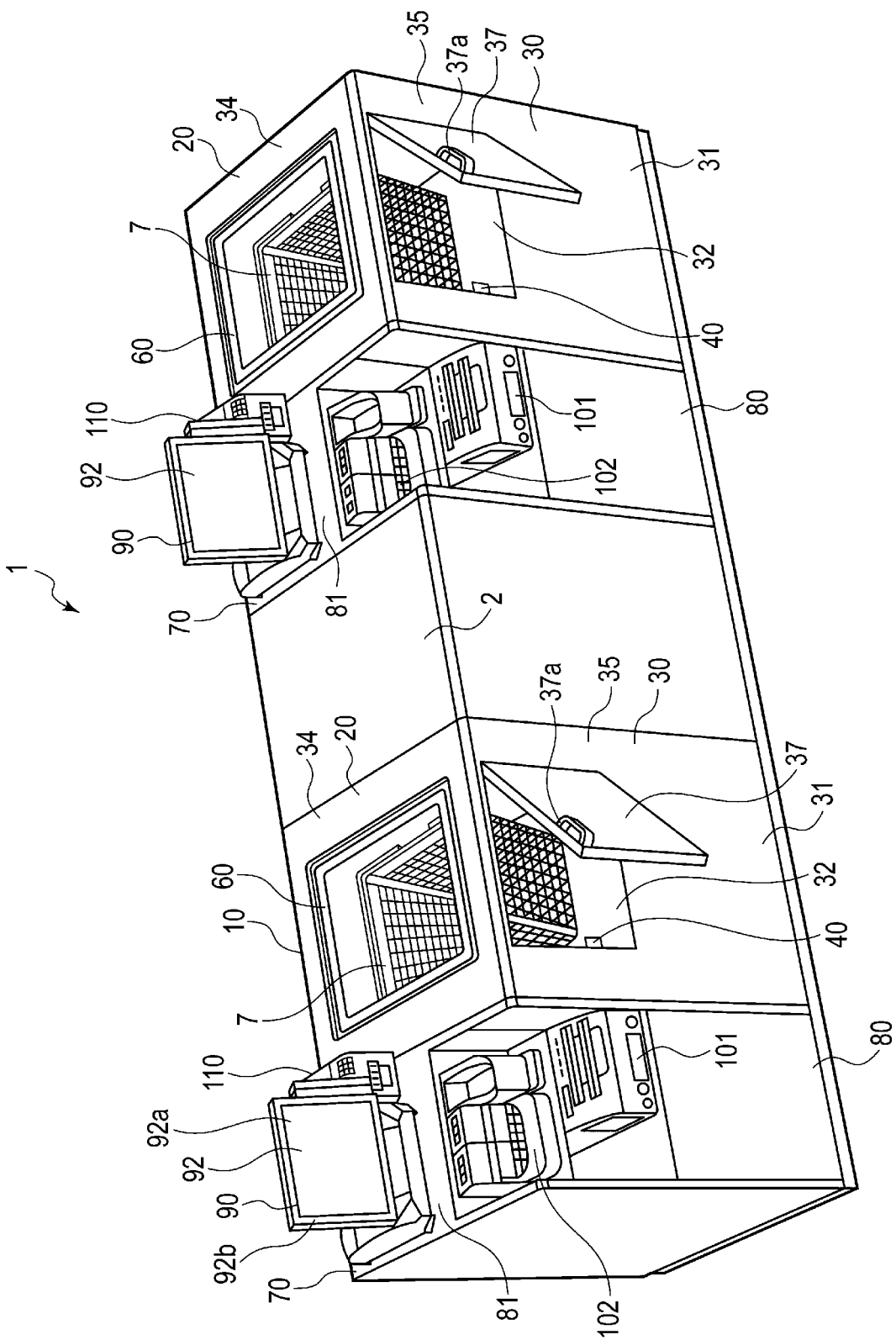
FIG. 5 is a perspective view showing a configuration of a modification of the commodity sales processing apparatus.

Furthermore, the light emitting unit 60 is provided outside the accommodation chamber 32, but may be provided within the accommodation chamber 32 or on a surface that constitutes the accommodation chamber 32. As an example, the light emitting unit 60 may be configured in a rectangular annular shape having the same shape as the outer edge in the vicinity of the outer edge of the transparent portion 34a on the upper surface of the accommodation chamber 32, as in a modification shown in FIG. 5. The shape of the light emitting unit 60 is not limited to an annular shape.

Figure 6:
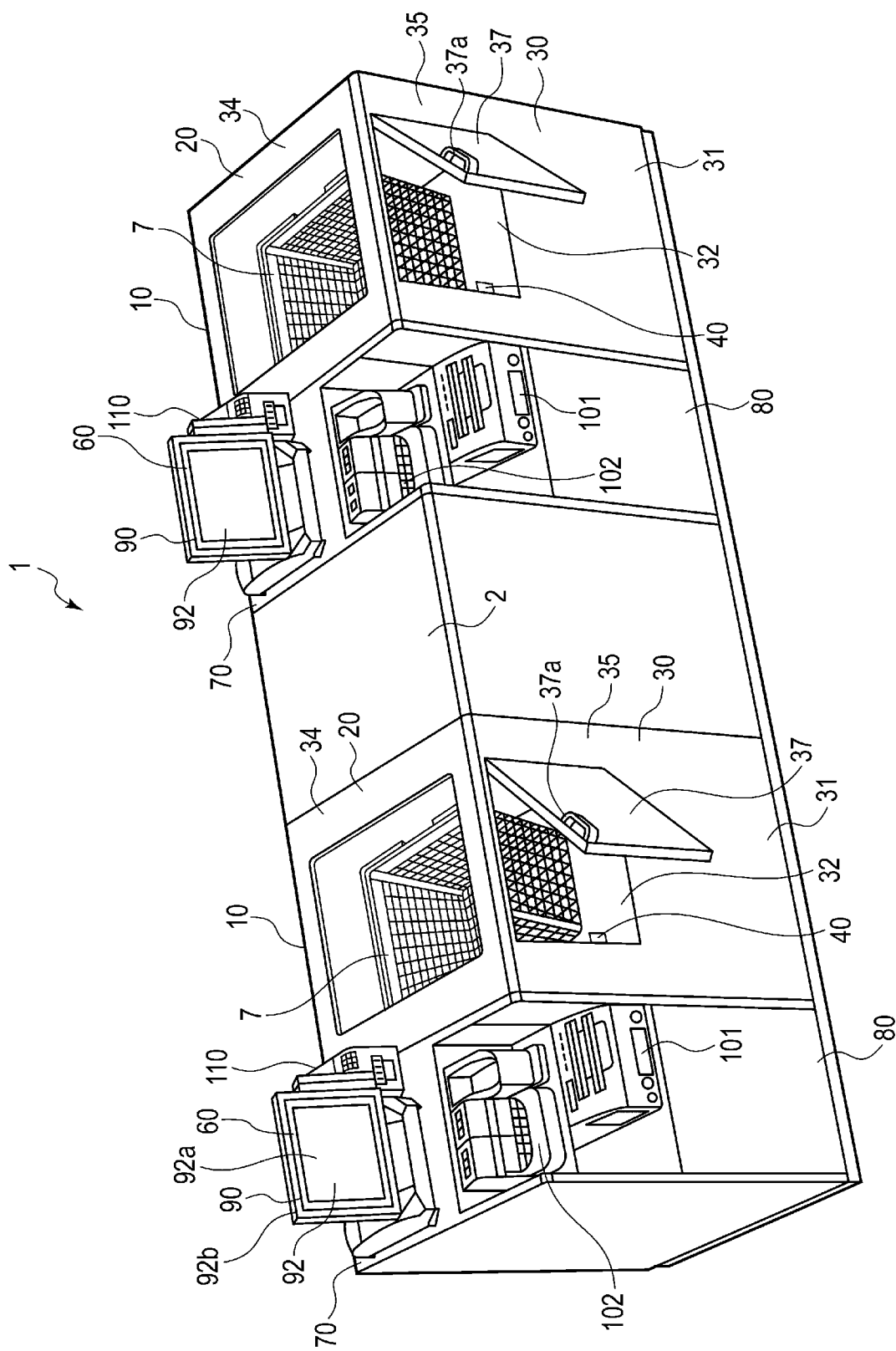
FIG. 6 is a perspective view showing a configuration of another modification of the commodity sales processing apparatus.

The light emitting unit 60 is not limited to being provided in the reading device 20. The light emitting unit 60 may be provided in the processing device 70. As an example, the light emitting unit 60 may be provided around the display screen 92a as in a modification shown in FIG. 6. As a specific example, the light emitting unit 60 may be provided in the frame 92b of the display unit 92. Furthermore, as an example, the light emitting unit 60 may be configured in an annular shape in which the display screen 92a is disposed inside. The shape of the light emitting unit 60 is not limited to an annular shape. Alternatively, the light emitting unit 60 may be provided on the display screen 92a. Alternatively, by causing a part of the display screen 92a to emit light, the display screen 92a may function as a notification unit.

The light emitting unit 60 may be provided in each of the reading device 20 and the processing device 70. As an example, the commodity sales processing apparatus 10 may include the light emitting unit 60 provided in the reading device 20 shown in FIG. 1 or 5 and the light emitting unit 60 provided in the processing device 70 shown in FIG. 6.

Alternatively, the light emitting unit 60 may be provided as a separate body separately from the reading device 20 and the processing device 70.

In the present embodiment, the light emitting unit 60 emits light according to the state of the commodity sales processing apparatus 10, but is not limited thereto. The light emitting unit 60 may emit light only after completion of settlement processing. That is, the light emitting unit 60 may be configured to emit light only in a state in which taking-out of the commodity 5 from the accommodation chamber 32 is forgotten.

The combination of the color of emitting light, lighting, and blinking by the light emitting unit 60 in the present embodiment is an example. The light emitting unit 60 may be capable of emitting light of only one color. Alternatively, the light emitting unit 60 may be configured to be able to emit light of only one of lighting or blinking.

The commodity sales processing apparatus 10 may have a table. This table indicates the meaning of the combination of lighting, blinking, and light colors of the light emitting unit 60. This table is attached to, for example, a portion of the commodity sales processing apparatus 10 that is visible to the customer. The customer may easily understand the meaning of the combination of the emitting light colors, lighting, and blinking of the light emitting unit by checking the table. Therefore, it is possible to further prevent the customer from forgetting to take out the commodity 5.

Figure 7:
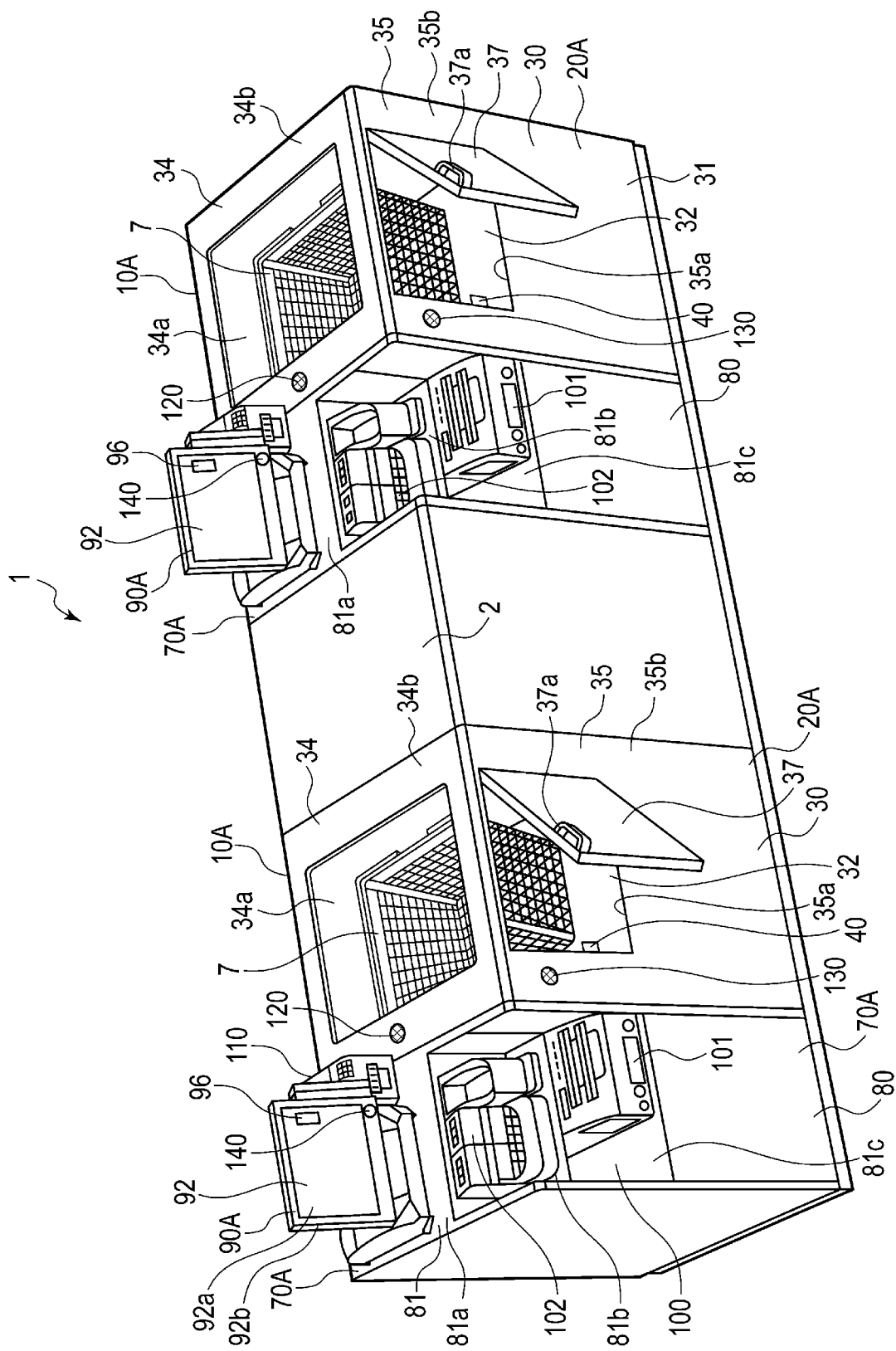
FIG. 7 is a perspective view showing a configuration of a commodity sales processing apparatus according to a second embodiment.
Figure 8:
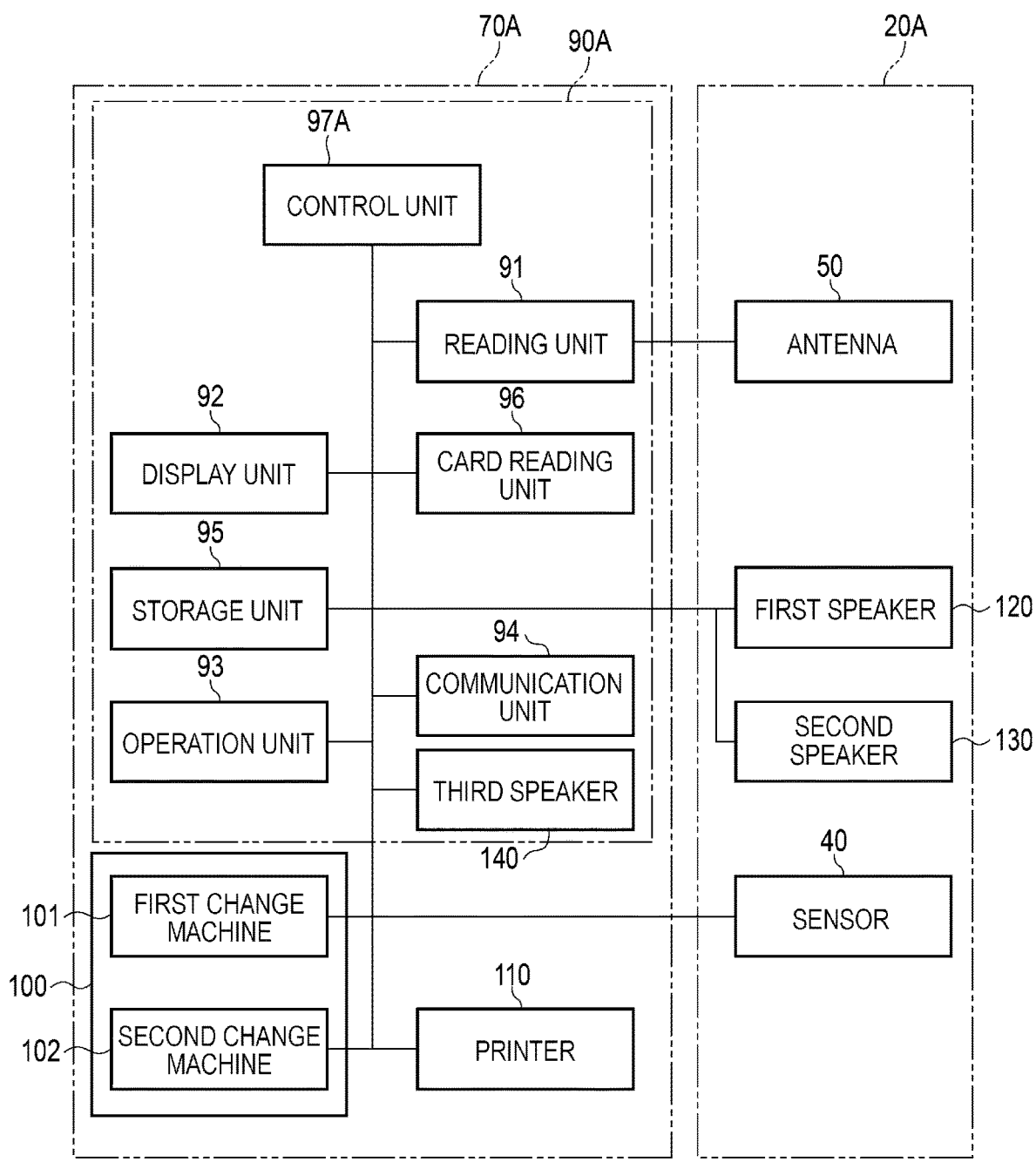
FIG. 8 is a block diagram showing the configuration of the commodity sales processing apparatus.

Next, a commodity sales processing apparatus 10A according to a second embodiment will be described with reference to FIGS. 7 and 8. The configuration having the same function as that of the first embodiment is denoted by the same reference numeral as that of the first embodiment and the description thereof is omitted. FIG. 7 is a perspective view showing a configuration of the commodity sales processing apparatus 10A. FIG. 8 is a block diagram showing the configuration of the commodity sales processing apparatus 10A.

As shown in FIGS. 7 and 8, the commodity sales processing apparatus 10A includes a reading device 20A and a processing device 70A. The reading device 20A includes the reading device main body 30, the sensor 40, the antenna 50, a first speaker 120, and a second speaker 130.

The first speaker 120 and the second speaker 130 are an example of a notification unit. The notification unit notifies of a state in which the commodity 5 is accommodated in the accommodation chamber 32. The notification unit calls attention of the customer not to forget to take out the commodity 5 by notifying. The first speaker 120 and the second speaker 130 notify the customer by sound.

The processing device 70A includes, as an example, the housing 80, a terminal 90A, the change machine 100, the printer 110, and a third speaker 140.

The terminal 90A includes the reading unit 91, the display unit 92, the operation unit 93, the communication unit 94, the storage unit 95, the card reading unit 96, and a control unit 97A. The control unit 97A is, for example, a central processing unit (CPU) or the like. The control unit 97A executes various control and processing functions by executing the program stored in the storage unit 95.

The control unit 97A is electrically connected to the sensor 40, the reading unit 91, the display unit 92, the operation unit 93, the communication unit 94, the storage unit 95, the first change machine 101, the second change machine 102, the printer 110, the first speaker 120, the second speaker 130, and the third speaker 140.

The control unit 97A is different from the control unit 97 of the first embodiment in that the control unit 97A controls the first speaker 120, the second speaker 130, and the third speaker 140 instead of controlling the light emitting unit 60. Similar to the control unit 97, the control unit 97A controls each of the electrically connected components according to the program stored in the storage unit 95.

Next, control of the first speaker 120, the second speaker 130, and the third speaker 140 by the control unit 97A will be described.

When the commodity sales processing apparatus is in a ready state, the control unit 97A drives the speakers 120, 130, and 140, for example, to generate sounds or voices corresponding to the ready state. An example of a sound or voice corresponding to the ready state is a voice "it is in the ready state".

In the state of waiting for a commodity, the control unit 97A drives the speakers 120, 130, and 140 to generate sounds or voices corresponding to the state of waiting for a commodity. An example of a sound or a voice corresponding to the state of waiting for a commodity is a voice of "it is in the state of waiting for a commodity".

In a state of reading the commodity 5 and a state of performing sales registration processing, the control unit 97A drives the speakers 120, 130, and 140 to generate sounds or voices corresponding to the state of reading the commodity 5 and the state of the sales registration processing. An example of a sound or a voice corresponding to the state of reading the commodity 5 and the state of the sales registration processing is a sound of "in the process of reading".

In the state of performing settlement processing, the control unit 97A drives the speakers 120, 130, and 140 to generate sounds or voices corresponding to the settlement processing. An example of a sound or voice corresponding to the settlement processing is a voice "in the process of settlement".

When the settlement processing is completed, the control unit 97A drives the speakers 120, 130, and 140 to generate sound or voice data notifying that the commodity 5 is accommodated in the accommodation chamber 32. An example of a sound or voice data notifying that the commodity 5 is accommodated in the accommodation chamber 32 is a voice "Please take out the commodity 5".

As an example, the commodity sales processing apparatus 10A configured as described above drives the speakers 120, 130, and 140 at timings at which the commodity sales processing apparatus 10 of the first embodiment drives the light emitting units 61 and 62 to emit light to generate sounds or voices according to the state of the commodity sales processing apparatus 10A described above. The control unit 97A may cause the speakers 120, 130, and 140 to continuously generate sounds or voices. As a specific example, in the state of waiting for a commodity, the voice "it is in the state of waiting for a commodity" is repeatedly generated. In this way, while each state is maintained, sound or voice data may be repeatedly generated corresponding to the state.

In the present embodiment, the same effects as in the first embodiment can be obtained.

Although the speakers 120, 130, and 140 are provided as an example of the notification unit in the present embodiment, the present embodiment is not limited thereto. In other examples, only one or two of the speakers 120, 130, 140 may be provided.

As an example of this configuration, a speaker as the notification unit may be provided only in the reading device 20A. In other words, only the first speaker 120 and the second speaker 130 may be provided. Alternatively, a speaker as the notification unit may be provided only in the processing device 70A. In other words, only the third speaker 140 may be provided. Alternatively, separate speakers may be provided separately from the reading device 20A and the processing device 70. Also, the number of speakers is not limited.

In the present embodiment, the speakers 120, 130, and 140 generate sounds or voices corresponding to the states in each state of the commodity sales processing apparatus 10A, but the present embodiment is not limited thereto. The first speaker 120, the second speaker 130, and the third speaker 140 may generate sounds or voices only after settlement processing is completed. That is, the speakers 120, 130, and 140 may generate sounds or voices only in a state in which taking-out of the commodity 5 from the accommodation chamber 32 is forgotten.

In the present embodiment, a speaker is used as an example of the notification unit. However, the notification unit that notifies by generating a sound is not limited to the speaker. In another example, the notification unit may be a chime or a buzzer.

Figure 9:
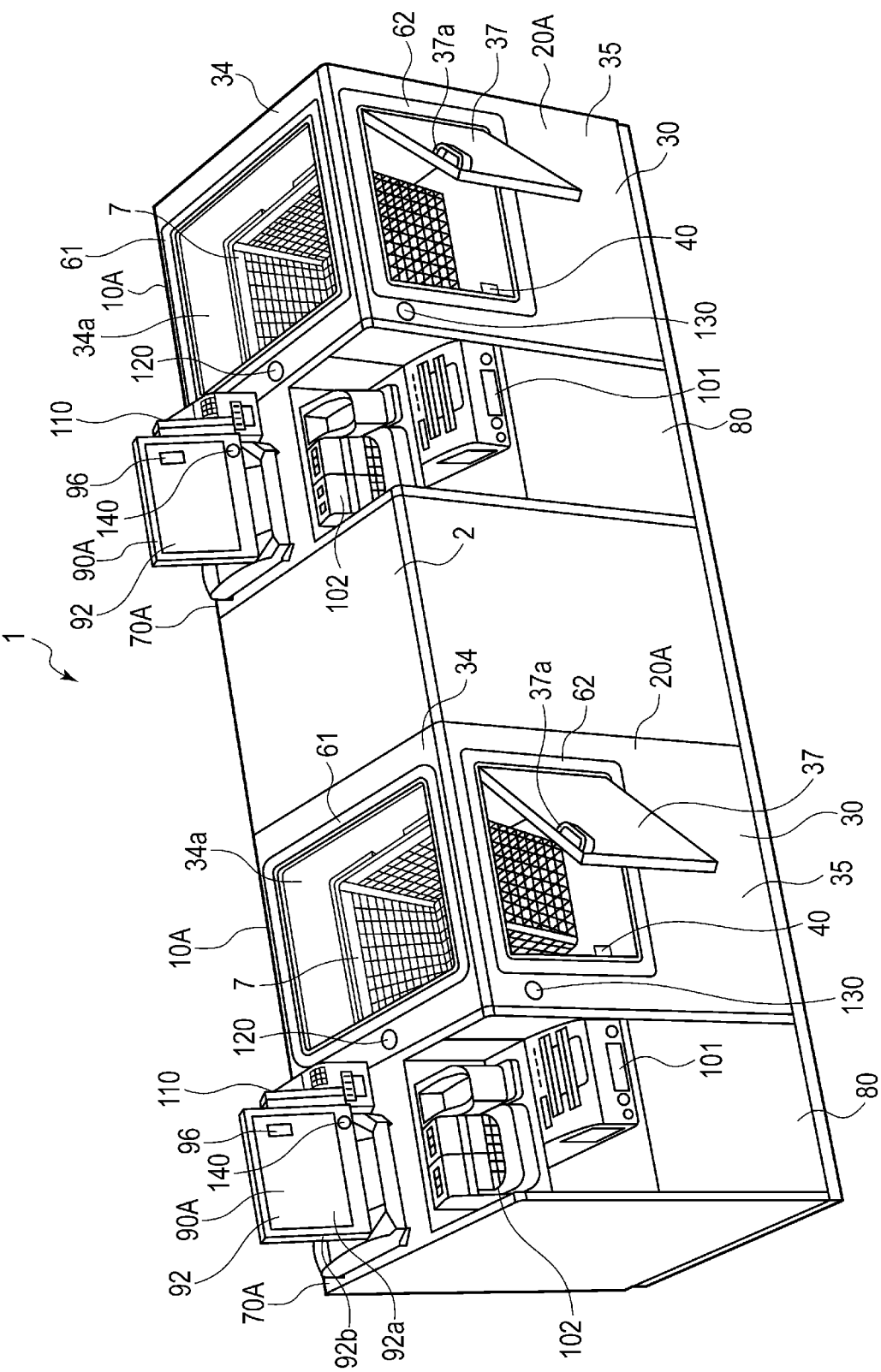
FIG. 9 is a perspective view showing a modification of the commodity sales processing apparatus.

In the second embodiment, the commodity sales processing apparatus 10A includes only one type of notification unit. That is, in the second embodiment, a type of notification unit that notifies by generating sound or voice data is used. However, the notification unit is not limited to only one type of notification unit. As an example, as in a modification of the second embodiment shown in FIG. 9, the commodity sales processing apparatus 10A further includes the light emitting units 61 and 62 described in the first embodiment as a notification unit. That is, the commodity sales processing apparatus 10A may include a type of notification unit that notifies by emitting light. As described above, the commodity sales processing apparatuses 10 and 10A are not limited to having only one type of notification unit. The commodity sales processing apparatuses 10 and 10A may include a plurality of types of notification units.

Furthermore, the commodity sales processing apparatus is not limited to the embodiments or the modification described above. For example, the reading unit 91 of the reading devices 20 and 20A is incorporated into the processing devices 70 and 70A, for example. However, the reading unit 91 may be provided in the reading device 20. As an example, the reading unit 91 is arranged within the outer shell 31 and becomes a part of the reading device 20. In this case, the reading unit 91 is electrically connected to the control units 97 and 97A by a signal line or the like.

When the settlement processing is completed, the control units 97 and 97A drive the light emitting units 61 and 62 or the speakers 120, 130 and 140 as the notification unit so as to notify that the commodity 5 is accommodated in the accommodation chamber 32. However, after the settlement processing is completed, the control units 97 and 97A check whether or not the commodity 5 is accommodated in the accommodation chamber 32, and if it is determined that the commodity 5 is accommodated in the accommodation chamber 32, the control units 97 and 97A may drive the light emitting units 61 and 62 or the speakers 120, 130 and 140.

As an example, when the settlement processing is completed, the control units 97 and 97A, for example, may control the reading unit 91 to read the information of the RFID tag 6 of the commodity 5 in the accommodation chamber 32 via the antenna 50 after a predetermined time elapses. The predetermined time here is determined based on an average time until the customer takes out the commodity 5 from the accommodation chamber 32 after the settlement processing. This predetermined time may be determined by experiment. The information of the RFID tag 6 may be read by the antenna 50 without waiting for the predetermined time to elapse.

When the commodity 5 is present in the accommodation chamber 32, the reading unit 91 receives the information of the RFID tag 6 via the antenna 50. Therefore, when the reading unit 91 receives a signal via the antenna 50, the control units 97 and 97A determine that the commodity 5 is accommodated in the accommodation chamber 32. When it is determined that the commodity 5 is accommodated in the accommodation chamber 32, the control units 97 and 97A determine that the commodity 5 is forgotten to be taken out and drive the light emitting units 61 and 62 or the speakers 120, 130, and 140 to notify.

When the antenna 50 does not receive a signal from the RFID tag 6, the control units 97 and 97A determine that the commodity 5 is taken out from the accommodation chamber 32. When it is determined that the commodity 5 is taken out from the accommodation chamber 32, the control units 97 and 97A do not drive the notification unit.

As another example, the accommodation chamber 32 may be provided with a weight sensor. The weight sensor transmits a signal corresponding to the weight of the item accommodated in the accommodation chamber 32 to the control units 97 and 97A. The weight sensor is provided, for example, on the bottom of the accommodation chamber 32.

When the commodity 5 is accommodated in the accommodation chamber 32, the signal from the weight sensor corresponds to the weight of the commodity 5. For this reason, after the settlement processing is completed, for example, when the signal from the weight sensor after a predetermined time elapsed indicates some weight, the control units 97 and 97A determine that the commodity 5 is accommodated in the accommodation chamber 32. When it is determined that the commodity 5 is accommodated in the accommodation chamber 32, the control units 97 and 97A determine that the commodity 5 is forgotten to be taken out and drive the notification unit to notify. After the settlement processing, the weight in the accommodation chamber 32 may be detected by the weight sensor without elapsing a predetermined time.

When the signal from the weight sensor is a signal indicating that the commodity 5 is not present in the accommodation chamber 32, for example, when the signal indicates zero weight, the control unit determines that the commodity 5 is taken out from the accommodation chamber 32 and does not drive the notification unit.

As still another example, when the control units 97 and 97A do not detect that the door 37 is at least open within a predetermined time based on a signal from the sensor 40 after the settlement processing, the control units 97 and 97A may determine that the commodity 5 is accommodated in the accommodation chamber 32. That is, in order to take out the commodity 5 from the accommodation chamber 32, at least the door 37 needs to be open.

In the embodiment described above, the light emitting unit 60 and the speakers 120, 130, and 140 are used as the notification unit as an example. However, the notification unit is not limited to being newly provided. The notification unit may have an existing configuration. For example, when there is an existing light emitting unit, the existing light emitting unit may be used as a notification unit. If there is an existing speaker, the existing speaker may be used as a notification unit.

As an example, when the commodity sales processing apparatus has a configuration in which the door 37 is automatically open, after the settlement processing is completed, or as described above, when it is determined that the commodity 5 is accommodated in the accommodation chamber 32 after the settlement processing is completed, the door 37 may be open to notify the customer. This embodiment will be described as a third embodiment with reference to FIG. 10.

Figure 10:
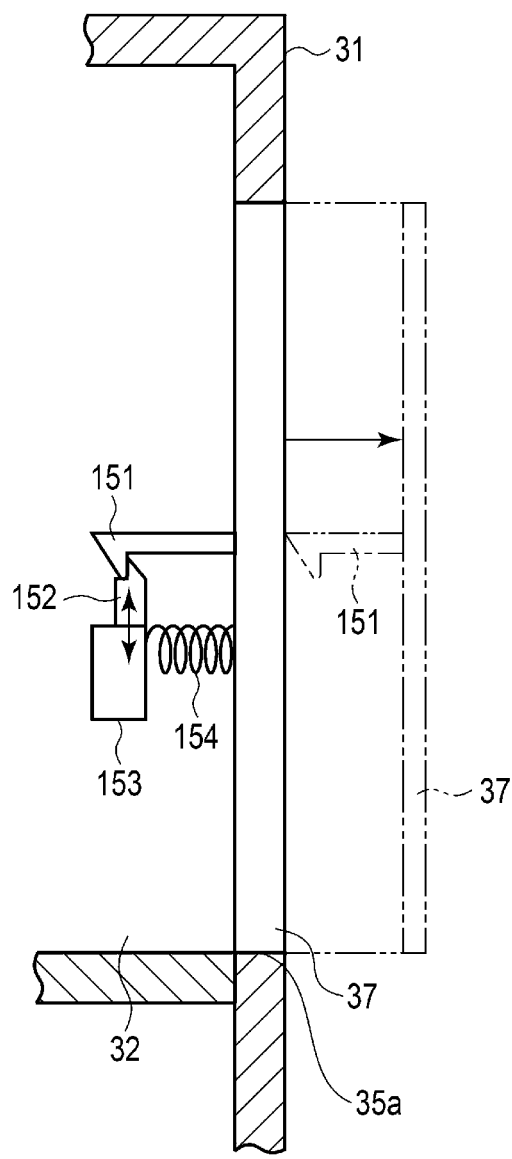
FIG. 10 is an explanatory view showing a main part of a commodity sales processing apparatus according to a third embodiment.

FIG. 10 is an explanatory view showing a modification of the commodity sales processing apparatus 10 according to the third embodiment. The present embodiment is different in that the commodity sales processing apparatus 10 does not include the light emitting unit 60 and further includes a locking device 150. The other configuration is the same as that of the first embodiment. In the third embodiment, components having the same functions as in the first embodiment are denoted by the same reference numerals as in the first embodiment, and the description thereof is omitted. In the present embodiment, the control unit 97 further has a function of controlling the lock device 150 in addition to the functions of the first embodiment.

FIG. 10 is a schematic view showing the lock device 150 of the door 37 of the commodity sales processing apparatus 10. In addition, FIG. 10 is a cross-sectional view showing the outer shell 31 of the reading device 20 taken along the F10-Fl0 cross-section shown in FIG. 1 so as to show the accommodation chamber 32 and the door 37. In other words, FIG. 10 is a cross-sectional view showing the outer shell 31 cut along the cutting plane perpendicular to the left and right direction through the edge of the opening 35a.

As shown in FIG. 10, the lock device 150 includes an engaging portion 151 provided in the door 37, an engaged portion 152 provided in the accommodation chamber 32, a drive unit 153, and a biasing member 154. The locking device 150 is configured to be able to hold the door 37 in a closed state. Moreover, the lock device 150 is configured to be able to open the door 37.

The engaging portion 151 is engaged with the engaged portion 152 when the door 37 is in a closed state. In FIG. 10, the door 37 in a closed state is shown by a solid line, and the door 37 in an open state is shown by a two-dot chain line. The engaged portion 152 is configured to release the engagement with the engaging portion 151. The drive unit 153 releases the engagement between the engaging portion 151 and the engaged portion 152 by driving the engaged portion 152. Here, the driving of the engaged portion 152 is, as an example, moving the engaged portion 152 so that the engagement with the engaging portion 151 is released. The drive unit 153 is controlled by the control unit 97.

The biasing member 154 biases the closed door 37 in the opening direction. The biasing member 154 is, for example, a coil spring. The biasing of the door 37 by the biasing member 154 is a biasing force that slightly opens the door 37 when the engagement between the engaging portion 151 and the engaged portion 152 is released. Here, "open slightly" means that even if the customer stands in front of the door 37, the door 37 opens to an extent that does not contact the customer.

In the present embodiment, the door 37 functions as a notification unit. When the settlement processing is completed, the control unit 97 causes the drive unit 153 to drive the engaged portion 152 to release the engagement between the engaging portion 151 and the engaged portion 152.

When the engagement between the engaging portion 151 and the engaged portion 152 is released, the door 37 is moved in the opening direction by the biasing force of the biasing member 154. The amount of movement of the door 37 at this time is such that the door 37 is slightly open from the closed state. The customer can recognize that the commodity 5 is accommodated in the accommodation chamber 32 by the automatically opened door 37.

In the present embodiment, it is possible to prevent the customer from forgetting to take out the commodity 5.

In the first to third embodiments described above, the accommodation chamber 32 is used as an example of the placement portion in which the commodity 5 is placed. However, the placement portion is not limited to being configured in a closed space such as the accommodation chamber 32. The placement portion may be a shelf as another example. That is, the placement portion may be configured such that a commodity can be placed without opening and closing the door.

As described above, according to the embodiments and the modifications described above, it is possible to prevent the customer from forgetting to take the commodity 5.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A commodity sales processing apparatus, comprising:
a placement portion being an accommodation chamber provided inside an outer shell having a light emitting component provided on an upper surface of the outer shell including an upper wall of the outer shell having a transparent portion that allows the accommodation chamber to be visible from the outside, wherein a commodity is placed;
an antenna configured to receive a signal from an RFID tag included in the commodity placed in the placement portion;
a reading component configured to read information of the RFID tag based on the signal received via the antenna;
a notification component configured to issue a notification indicating that the commodity is placed in the placement portion; and
a control component configured to drive the notification component after settlement processing.

2. The apparatus according to claim 1, wherein the notification component includes the light emitting component configured to switch between a light emitting state and a non-light emitting state.

3. The apparatus according to claim 2, further comprising a display screen that displays information on the commodity, wherein the light emitting component is provided around the display screen.

4. The apparatus according to claim 1, wherein the notification component includes a speaker.

5. The apparatus according to claim 1, wherein the notification component is further configured to issue another notification indicating that the commodity is removed from the placement portion.

6. The apparatus according to claim 1, wherein the placement portion is configured to accommodate a shopping basket.

7. A commodity sales processing method, comprising:
receiving a signal from an RFID tag included in a commodity placed in a placement portion of a commodity sales processing apparatus, wherein the placement portion is an accommodation chamber provided inside an outer shell having a light emitting component provided on an upper surface of the outer shell including an upper wall of the outer shell having a transparent portion that allows the accommodation chamber to be visible from the outside;

reading information of the RFID tag based on the signal received;

issuing a notification indicating that the commodity is placed in the placement portion; and driving the issuance of the notification after settlement processing.

8. The method according to claim 7, wherein issuing a notification includes switching the light emitting component between a light emitting state and a non-light emitting state.

9. The method according to claim 8, further comprising displaying information on the commodity on a display.

10. The method according to claim 7, wherein issuing the notification includes using a speaker.

11. The method according to claim 7, further comprising: issuing another notification indicating that the commodity is removed from the placement portion.

12. A POS terminal, comprising:
a placement portion being an accommodation chamber provided inside an outer shell having a light emitting component provided on an upper surface of the outer shell including an upper wall of the outer shell having a transparent portion that allows the accommodation chamber to be visible from the outside, wherein a commodity is placed;

an antenna configured to receive a signal from an RFID tag included in the commodity placed in the placement portion;

a reading component configured to read information of the RFID tag based on the signal received via the antenna;

a notification component configured to issue a notification indicating that the commodity is placed in the placement portion;

a control component configured to drive the notification component after settlement processing; and a settlement processing component.

13. The POS terminal according to claim 12, wherein the notification component includes the light emitting component configured to switch between a light emitting state and a non-light emitting state.

14. The POS terminal according to claim 13, further comprising a display screen that displays information on the commodity, wherein the light emitting component is provided around the display screen.

15. The POS terminal according to claim 12, wherein the notification component includes a speaker.

16. The POS terminal according to claim 12, wherein the notification component is further configured to issue another notification indicating that the commodity is removed from the placement portion.

17. The POS terminal according to claim 12, wherein the placement portion is configured to accommodate a shopping basket.

* * * * *